(No Model.) 2 Sheets—Sheet 1.

A. KREUSLER.
STEAM GENERATOR.

No. 502,729. Patented Aug. 8, 1893.

WITNESSES:
William Goebel.
Richard Lips.

INVENTOR
Arnold Kreusler
BY
Adam E. Schat
ATTORNEY (No Model.) 2 Sheets—Sheet 2.
A. KREUSLER.
STEAM GENERATOR.
No. 502,729. Patented Aug. 8, 1893.
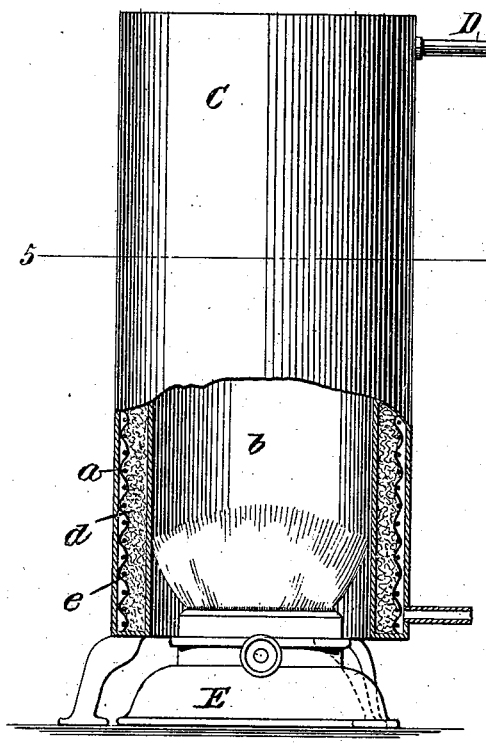
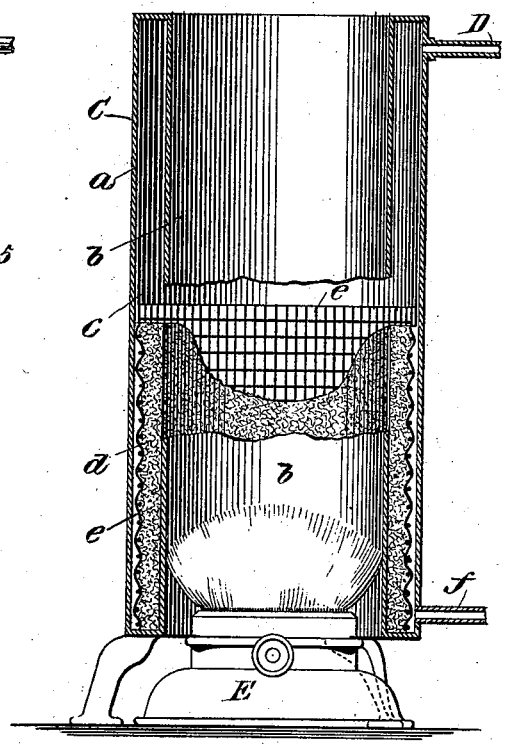
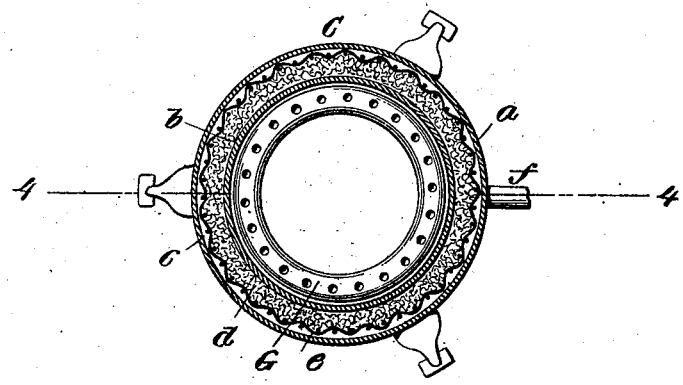
WITNESSES:
William Gaebel.
Richard Lips.
INVENTOR
Arnold Kreusler
BY
Adam E. Schatz
ATTORNEY.

UNITED STATES PATENT OFFICE.

ARNOLD KREUSLER, OF STATEN ISLAND, NEW YORK.

STEAM-GENERATOR.

SPECIFICATION forming part of Letters Patent No. 502,729, dated August 8, 1893.

Application filed August 19, 1892. Serial No. 443,529. (No model.)

*To all whom it may concern:*

Be it known that I, ARNOLD KREUSLER, a citizen of the United States, and a resident of Staten Island, in the county of Richmond and State of New York, have invented a certain new and useful Improved Steam-Generator, of which the following is a specification.

My invention relates to a means of generating steam for heating purposes.

Figure 1:
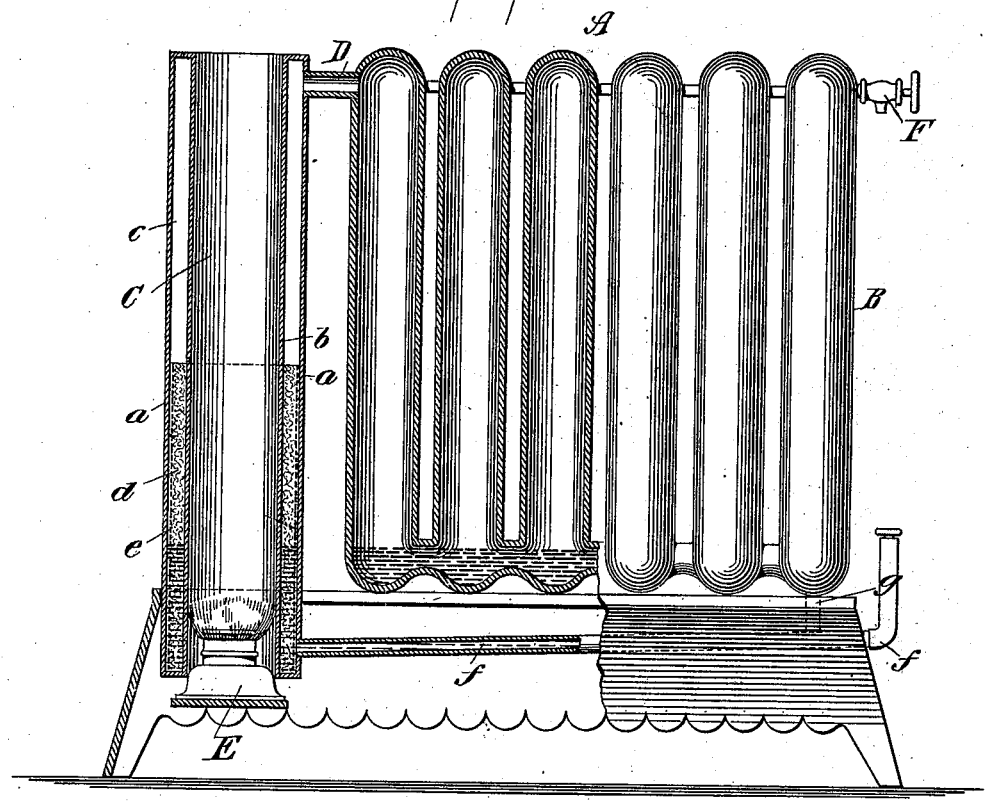
Figure 2:
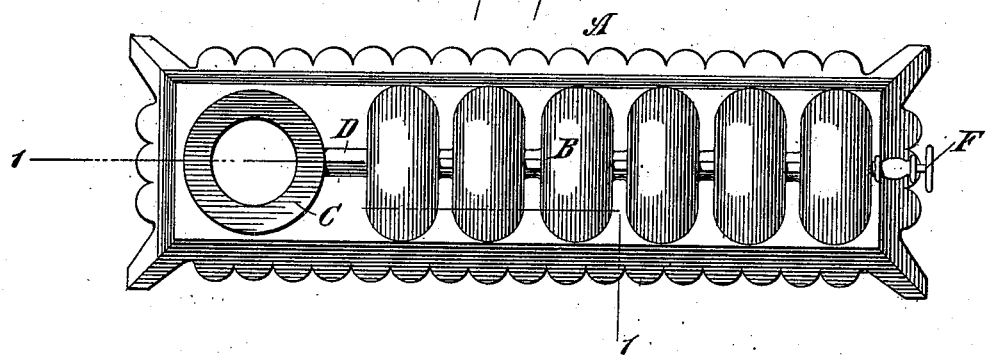

In the drawings Figure 1 represents a side elevation of one of my steam generators partly shown in section on the line 1—1 of Fig. 2 and connected with a radiator, which is used for the purpose of heating apartments, and showing a cross section of the the generator and radiator. Fig. 2 is a plan view of the same. Fig. 3 is a view in elevation of the generator not connected with a radiator, having a section cut away to show its interior construction. Fig. 4 represents a sectional view on line 4—4 of Fig. 5 with parts broken away to show the capillary material. Fig. 5 is a horizontal section on the line 5—5 of Fig. 3.

In the drawings like letters represent like parts.

The construction of my steam generator is as follows: Two shells or cylinders $a$ and $b$ are fitted one into the other leaving a space $c$ between, into which is inserted a material $d$ which has capillary qualities, and which is held to the side of the inner shell by the aid of a wire screen $e$ which surrounds it. The object of this is to assist the water in being distributed through the capillary material $d$ and thus expose a large surface to the action of the heat with a low water level. The object of the screen $e$ is to have an open space and thus facilitate the liberation of the steam.

The fire apparatus may be either an oil lamp or burner E, or gas burner G, or any other suitable means, such as a grate may be used if desired.

In the drawings C represents the generator, having the outer shell $a$ and the inner shell $b$, which are joined at their ends in any suitable manner. They may be riveted or screwed together with a flange or any other suitable means may be used. In the annular space $c$ is placed the capillary material $d$, which is surrounded by a wire cloth or perforated shell $e$, and is intended to provide a space for the easy liberation of the steam generated. The generator is placed upright and in the hollow part at its bottom is set a lamp, which may have a base E and a burner of a Rochester pattern or a Bunsen gas burner G may be used, or any other means for the application of heat to the interior of the generator A.

The generator A is provided at its outer shell, $a$, near the bottom with a water inlet pipe $f$ and at its top with a steam outlet pipe D.

In Fig. 1, A represents a generator of my construction in connection with a steam radiator; D the steam outlet pipe by means of which the steam generated in the generator C is carried off; F is a blow off; $g$ a return connection with the generator water inlet pipe $f$; B represents the radiator pipes. The steam generated is carried into the radiator through pipes D and circulating through it is condensed and the condensed water is carried back to the generator by flowing through pipe $g$, into inlet pipe $f$. When water is let into the generator it is filled as high as the dotted lines on the bottom of the radiator pipes B.

When the burner of the lamp E is lighted, the flames strike the side of the generator and the water being acted upon is turned almost instantly into steam.

The rapid generation of the steam carries up the water mechanically and brings it in contact with the heated surface of the generator and thus it produces superheated steam.

The capillary material that I prefer to use is asbestus, but I can use with good effect a wire or clay wick.

A great and important feature, that the construction of a steam generator built after my plan affords, is that it is at the same time its own chimney or draft pipe and thus a most perfect combustion of the fuel used and almost a full utilization of all heat units are obtained, since the heat being carried up strikes the inner side of the generator and the steam ascending to the steam outlet pipe D is almost superheated and steam is therefore generated much faster and at a very low expenditure of fuel for the amount of heat generated.

What I claim as new, and desire to secure by Letters Patent, is—

1. A steam generator for heating purposes, comprising in its construction upright tubular shells $a$ and $b$ having a water and steam space $c$ between them and having inlet and outlet connections with a radiator, and having capillary material arranged in said space, and means for heating the space inside the inner shell, substantially as and for the purpose set forth.

2. A steam generator for heating purposes, comprising in its construction upright tubular shells $a$ and $b$ having a water and steam space $c$ between them and having inlet and outlet connections with a radiator, and having capillary material arranged in said space, a screen surrounding said capillary material and holding it in contact with the inner shell, and means for heating the space inside the inner shell, as and for the purpose set forth.

Signed at New York, in the county of New York and State of New York, this 5th day of July, A. D. 1892.

ARNOLD KREUSLER.

Witnesses:
RICHARD LIPS,
JOHN T. LITTLE, Jr.